No. 709,811. Patented Sept. 23, 1902.
F. BAKER, Jr. & E. J. FRITSCH.
MACHINE FOR CUTTING COCOANUTS.
(Application filed Oct. 30, 1900.)
(No Model.) 4 Sheets—Sheet 2.

Witnesses:—
Inventors:
Franklin Baker Jr.
Edward J. Fritsch
by their Attorneys

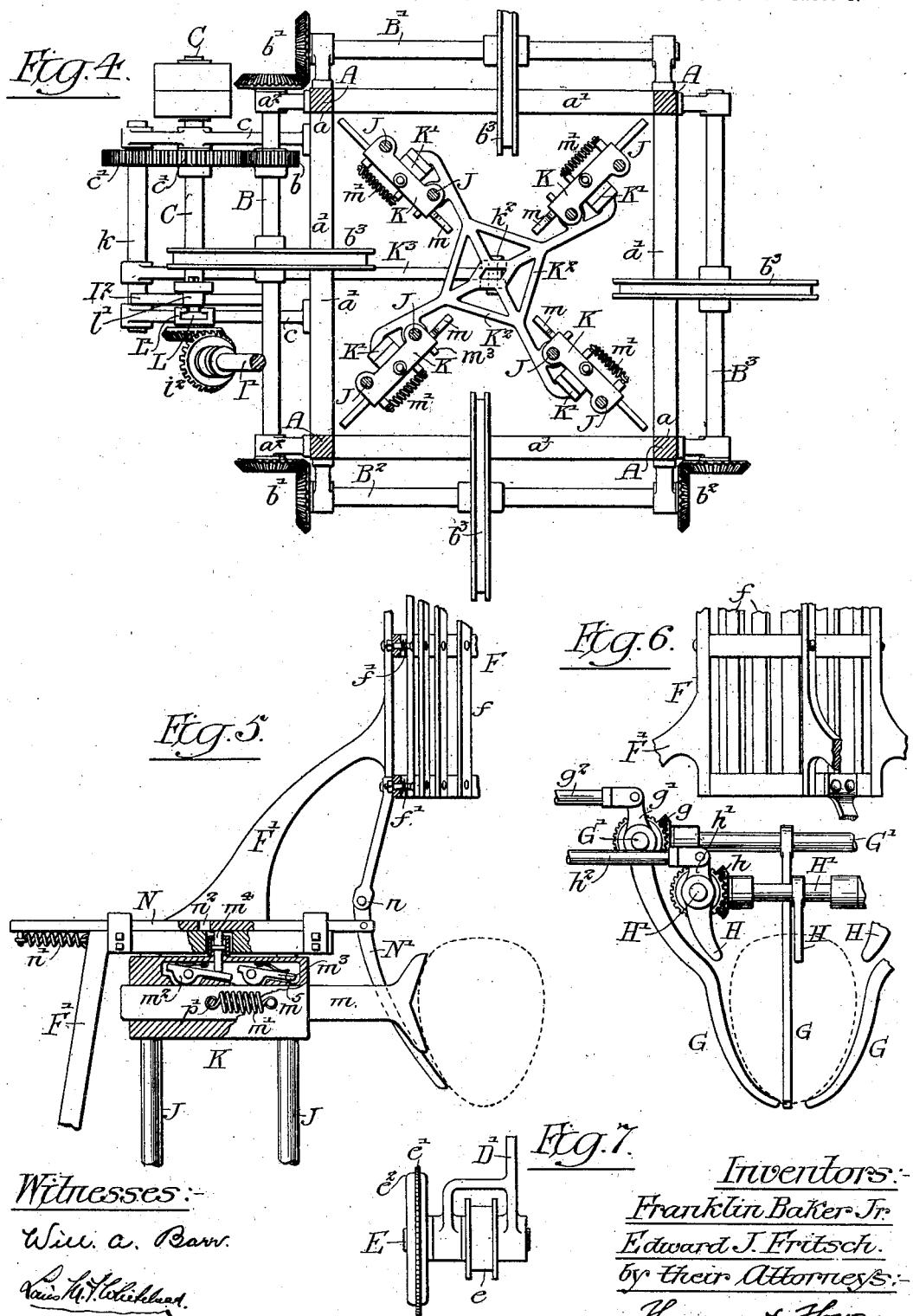

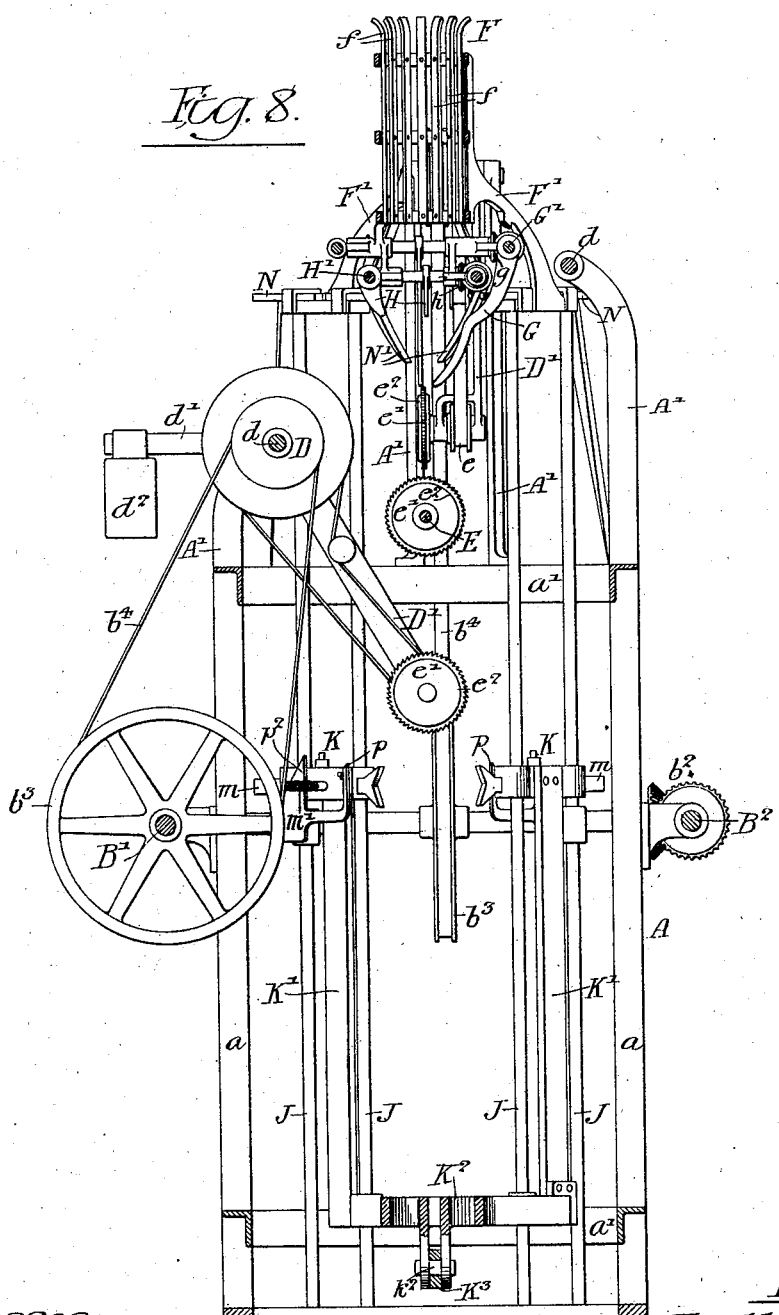

UNITED STATES PATENT OFFICE.

FRANKLIN BAKER, JR., AND EDWARD J. FRITSCH, OF PHILADELPHIA, PENNSYLVANIA; SAID FRITSCH ASSIGNOR TO SAID BAKER.

MACHINE FOR CUTTING COCOANUTS.

SPECIFICATION forming part of Letters Patent No. 709,811, dated September 23, 1902.

Application filed October 30, 1900. Serial No. 34,923. (No model.)

*To all whom it may concern:*

Be it known that we, FRANKLIN BAKER, Jr., and EDWARD J. FRITSCH, citizens of the United States, and residents of Philadelphia, Pennsylvania, have invented certain Improvements in Machines for Cutting Cocoanuts, of which the following is a specification.

The object of our invention is to construct a machine which will cut the shell of a cocoanut in segments, so that the shell can be readily removed to obtain the meat.

One of the main objects of the invention is to remove the shell in segments without cutting into the meat portion of the cocoanut to any great extent; and a further object of the invention is to provide means whereby the cocoanuts can be carried from a hopper past the saws, which are arranged one below another, and the cocoanut discharged from the machine after being cut, as fully described hereinafter.

Figure 1:
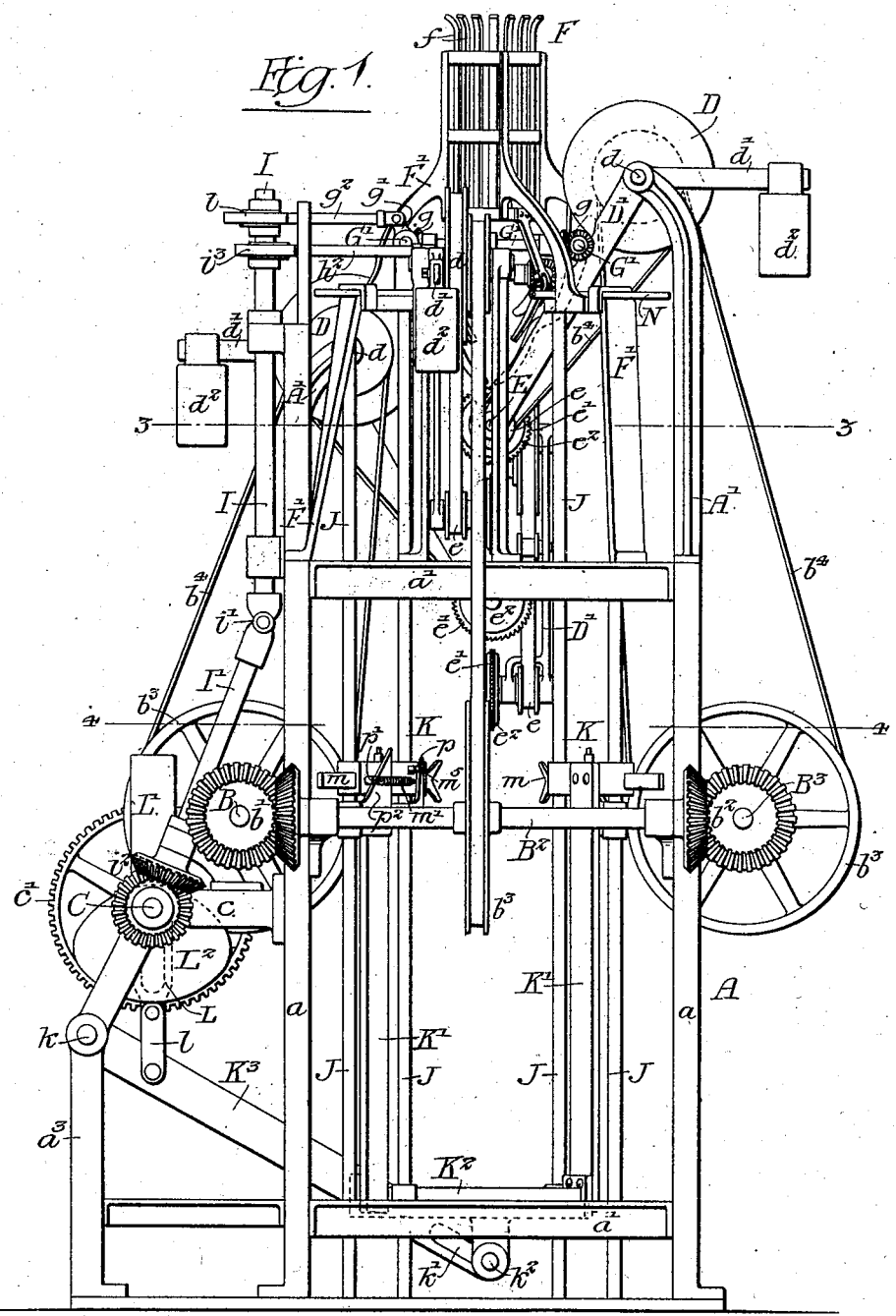
Figures 2, 3:
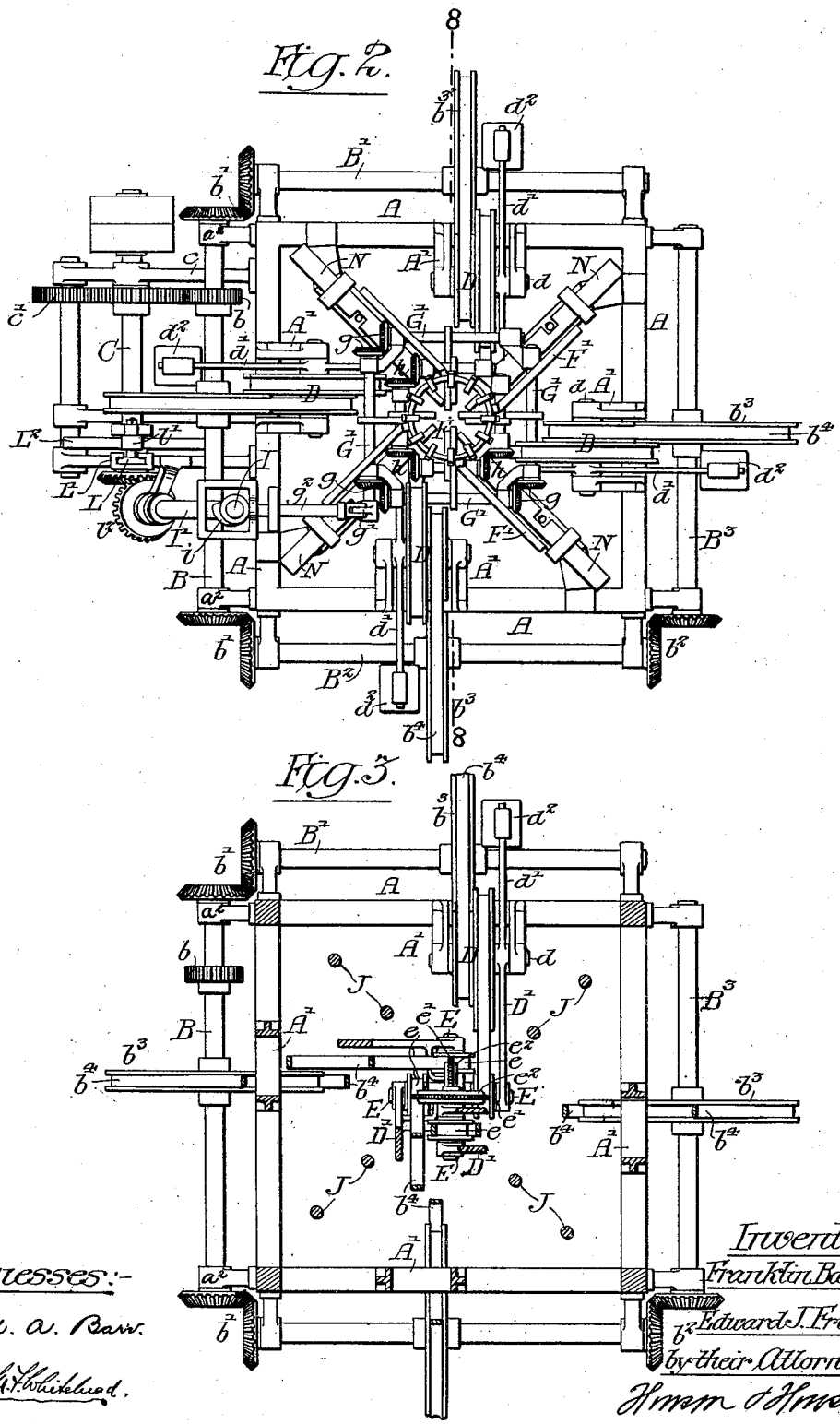

In the accompanying drawings, Figure 1 is a side elevation of our improved cocoanut-sawing machine. Fig. 2 is a plan view. Fig. 3 is a sectional plan view on the line 3 3, Fig. 1. Fig. 4 is a sectional plan view on the line 4 4, Fig. 1. Figs. 5 and 6 are views illustrating details of the mechinism. Fig. 7 is a detail of the saw; and Fig. 8 is a vertical sectional view of our improved machine, taken on the line 8 8, Fig. 2.

A is the frame of the machine, consisting of vertical members $a$ $a$ and transverse members $a'$, tying the vertical members together.
C is the driving-shaft, mounted on brackets $c$, projecting from the frame of the machine, and on this driving-shaft is a gear-wheel $c'$, which meshes with a pinion $b$ on the shaft B, mounted in bearings $a^2$ on the frame of the machine. This shaft B is geared to shafts B' B² by means of bevel-gears $b'$, and the shaft B² is geared to the shaft B³ by bevel-gears $b^2$, so that there is a shaft on each side of the frame. This frame is quadrangular in the present instance, as shown in Fig. 4. On each shaft is a belt-pulley $b^3$, around which passes a belt $b^4$ to a pulley D on the shaft $d$, carried by a bracket A' on the frame of the machine. There are four of these brackets, as clearly shown in Figs. 1 and 2, and the brackets are of different heights for the purpose described hereinafter.

Hung from each shaft $d$ is a pivoted hanger D', carrying at its lower end a spindle E. On this spindle is a belt-pulley $e$ and a saw $e'$. The saw has a flange $e^2$, preferably at each side, as shown in the detail view, Fig. 7, so as to prevent the saw from cutting into the meat of the cocoanut. The hanger D' and its saw are balanced by an arm $d'$, having an adjustable weight $d^2$, so that the saw will hang normally in the path of the cocoanut. The brackets A' and the hangers D' are so proportioned that the saws will be arranged one directly below another, and there are four saws, in the present instance so hung that they will quarter the cocoanut as it is carried past the saws. The saws are driven from their shafts B B' B² B³ and are independently movable toward and from the center of the machine, and the depth of cut is determined by the flanges $e^3$ on the saw, although in some instances a saw with a single flange may be used, or a fixed guide may be used, the guide projecting from the hanger and extending to a point back of the edge of the saw.

F is a hopper mounted on suitable supports F'. This hopper consists of a frame having a series of slats $f$, back of which are springs $f'$, which allow the slats to yield to accommodate cocoanuts of different sizes. Directly under the hopper F are arranged two sets of fingers G and H. The four fingers G are hung on shafts G', geared together by bevel-gears $g$, and one of these shafts G' has an arm $g'$ attached to a rod $g^2$, which is actuated by a cam $i$ on a vertical cam-shaft I. This cam-shaft I is connected to an inclined shaft I' by a gimbal-joint $i'$, and this inclined shaft is geared to the driving-shaft C through bevel-gears $i^2$. The short arms H are secured to shafts H', which are geared together by bevel-wheels $h$, and on one of the shafts H' is an arm $h'$, to which is coupled a rod $h^2$, actuated by a cam $i^3$ on the cam-shaft I. The cams $i$ and $i^3$ are so set that when one set of fingers is moved toward the center line through the hopper the other set of fingers is moved out clear of the cocoanut. By this arrangement one cocoanut at a time is allowed to drop in position to be grasped by the carrier, which carries the cocoanut through the machine, the remaining cocoanuts in the hopper being retained until the carrier returns to receive another cocoanut. The arms G form the bottom of the hopper, and in some instances when it is desired to feed one cocoanut at a time to the machine the said arms may be used without the body of the hopper.

K K are the carriers, being connected by bars K' to a frame $K^2$, Figs. 1 and 4. This frame, as well as the carriers K, are guided by vertical rods J, secured to the frame of the machine. Vertical reciprocating motion is transmitted to the carriers K and the frame $K^2$ by a lever $K^3$, hung at $k$ to a bearing $a^3$, attached to the frame of the machine. The lever $K^3$ has a slot $k'$ at its outer end, through which passes a pin $k^2$, extending through a lug on the under side of the frame $K^2$. The lever $K^3$ is connected to a slide L by a link $l$, Fig. 1, and this slide is arranged to travel in a sideway L' on the frame of the machine. On this slideway is a roller $l'$, which is in the path of the cam $L^2$ on the driving-shaft C, so that as the shaft and its cam revolve the lever $K^3$ will push the frame $K^2$ and the carriers K up in position to receive a cocoanut from the hopper and on the downstroke will carry the grippers, with the cocoanut, in position past the series of saws, which will cut the shell of the cocoanut to the desired depth, so that when the cocoanut is discharged at the base of the machine the shells can be removed from the cocoanut in quarters. The carriers K are constructed as clearly shown in Fig. 5. Each carrier has a sliding jaw $m$, which is shaped to properly hold the cocoanut, (shown by dotted lines,) and a spring $m'$ tends to project the jaw toward the center of the machine.

$m^2$ $m^3$ are two detents in the form of pivoted cams, having arms with springs tending to force the cams down upon the jaw so as to retain the jaw either in the projected or retracted position, the detent $m^2$ retaining the jaw in its retracted position and the detent $m^3$ retaining the jaw in its extended position. Above the arm of the detent $m^2$ is a pin $m^4$, and projecting from one side of the arm of the detent $m^3$ is a pin $m^5$.

Sliding on the frame F' is a plate N, connected at one end to an arm N', hung at $n$ to a bracket on the hopper F. A spring $n'$ tends to force the plate N toward the center of the machine. In the plate is an opening $n^2$, which is in a direct line with the pin $m^4$ on the carrier K when the fingers G do not hold a cocoanut; but when the fingers hold a cocoanut the arm N' is pushed back, causing the opening $n^2$ in the plate N to be out of line with the pin $m^4$, so that when the carrier is raised to receive a cocoanut the pin $m^4$ strikes the under side of the plate N, actuating the detent $m^2$ and releasing the jaw $m$. The spring $m'$ will force the jaw out, and as it is in line with the cocoanut held by the fingers G the several jaws $m$ will grasp the cocoanut. The detent $m^3$ will hold the jaws in their projected position until released by a trip after the cocoanut has been carried past the saws. This construction prevents the projection of the jaws when there is no cocoanut in position and allows for the operation of the jaws when there is a cocoanut in position. The movement of the carriers K is so timed with the means for operating the fingers G and H that before the carriers start on the downward stroke the fingers G release the cocoanut and the fingers H are moved toward the central line of the hopper, so as to hold the succeeding cocoanut, and at a certain point of the stroke the fingers G are moved toward the center and the fingers H are parted, when the cocoanut previously held by the fingers H will drop onto the fingers G ready to be gripped by the carriers. After the carriers pass the last saw the jaw $m$ is released by the projection on the detent $m^3$ striking a stop $p$ on the frame of the machine just prior to the projection $p'$ on the jaw $m$ coming in contact with the fixed cam-plate $p^2$. This cam-plate causes the jaw to retract and release the cocoanut, the jaws being held in the retracted position by the detent $m^2$ until its pin $m^4$ strikes the plate N, when the above operation will be repeated. It will be understood that the mechanism for controlling and operating the jaws are duplicated on the four carriers, as will be readily seen by the drawings.

By our improved apparatus the cocoanuts can be fed into a hopper and removed therefrom one at a time and carried past a series of saws, which cut the shell of the cocoanut into sections. In the present construction the saws are set one below another, so that only a single cut is made in the cocoanut at one time; but as the cocoanut passes through the machine it is cut in the present instance into quarters.

It will be understood that the machine may be constructed to sever the cocoanut into halves, thirds, quarters, or as many sections as desired; but we have found that quartering the cocoanut is preferable, the saws being arranged so that they will cut the shell of the cocoanut, leaving the meat intact.

We claim as our invention—

1. The combination in a machine for sawing the shells of cocoanuts, of a number of saws placed one before the other along the line of motion of a cocoanut through the machine, means for gripping the cocoanut and causing different portions of its surface to pass successively into contact with said saws, substantially as described.

2. The combination in a machine for sawing the shells of a cocoanut, of a number of saws arranged one before the other along the line of motion of the cocoanuts through the machine so that they will operate successively upon a cocoanut passed before them, and a carrier for moving the cocoanuts successively in the paths of the saws and causing different portions of their surfaces to contact successively with said saws, with means for limiting the depth of the cut of said saws, substantially as described.

3. The combination in a cocoanut-shell-cutting machine, of saws carried by yielding bearings, said saws having their axes placed in different but parallel planes, a hopper and means for gripping the cocoanut and carrying it from the hopper past the saws, said saws being arranged to contact successively with different portions of the surface of a cocoanut-shell, substantially as described.

4. The combination of saws mounted on yielding bearings, means for driving the saws, a hopper having yielding side members movable parallel to themselves, whereby the hopper is made to accommodate different sizes of cocoanuts, with means for gripping the cocoanuts and carrying them from the hopper past the saws, substantially as described.

5. The combination in a cocoanut-cutting machine, of saws and gripping mechanism for holding the cocoanut during its passage through the machine, said mechanism including spring-plungers movable in lines at right angles to the line of motion of the cocoanuts through the machine, with means for operating the same, substantially as described.

6. The combination in a machine for cutting cocoanuts, of a hopper, series of saws mounted on yielding bearings, said saws being arranged successively and around the line of motion of the cocoanut through the machine, with carriers for moving the cocoanuts successively from the hopper past the saws, substantially as described.

7. The combination in a machine for sawing cocoanuts, of a hopper, saws for cutting the shell of a cocoanut, carriers for moving the cocoanuts from the hopper past the saws, a set of fingers constructed to retain the cocoanuts in the hopper until one is gripped by the carriers, and a second set of fingers constructed to act at a level different from the first set to retain successive cocoanuts within the hopper, while the first set of fingers is open to permit the removal of a cocoanut by the carriers, substantially as described.

8. The combination in a machine for sawing cocoanuts, of a hopper, two sets of fingers directly under the hopper, means for moving one set of fingers toward the center line of the hopper, while the other fingers are moved out from the central line, saws for severing the shell of the cocoanut arranged under the fingers, and carriers having jaws for gripping the cocoanut and carrying it from the hopper past the saws, substantially as described.

9. The combination of a hopper, a series of saws, carriers for the cocoanuts, each carrier having movable jaws, springs for projecting the jaws, detents for holding the jaws in the projected and in the retracted position, and stops for releasing the detents, substantially as and for the purpose set forth.

10. The combination of a hopper, saws, carriers for the cocoanuts, each carrier having jaws, springs for projecting the jaws, two cam-shaped detents, arms on the detents, springs for holding the detents in position, means for operating one of the detents at the end of the upstroke, means for operating the other detent at the end of the downstroke, and a cam for withdrawing the jaws, substantially as described.

11. The combination of a hopper, saws mounted in the hopper, carriers for carrying the cocoanuts from the hopper past the saws, each carrier having a jaw movable toward and from the center of the machine, springs for moving the jaws out toward the center of the machine, two detents, one for retaining the jaw in the projected position and one for retaining the jaw in its retracted position, a pin mounted above one of said detents, a plate, an arm attached to the plate and controlled by the cocoanut, an opening in the plate in line with the pin on the carrier when the cocoanut is not in position, a cam for retracting the jaw, and a stop for releasing the jaw prior to the action of the cam so as to release the cocoanut, substantially as described.

In testimony whereof we have signed our names to this specification in the presence of two subscribing witnesses.

FRANKLIN BAKER, JR.
EDWARD J. FRITSCH.

Witnesses:
WILL. A. BARR,
JOS. H. KLEIN.